No. 660,151. Patented Oct. 23, 1900.
W. DORVAL.
FILTER.
(Application filed Apr. 23, 1900.)
(No Model.) 3 Sheets—Sheet 2.
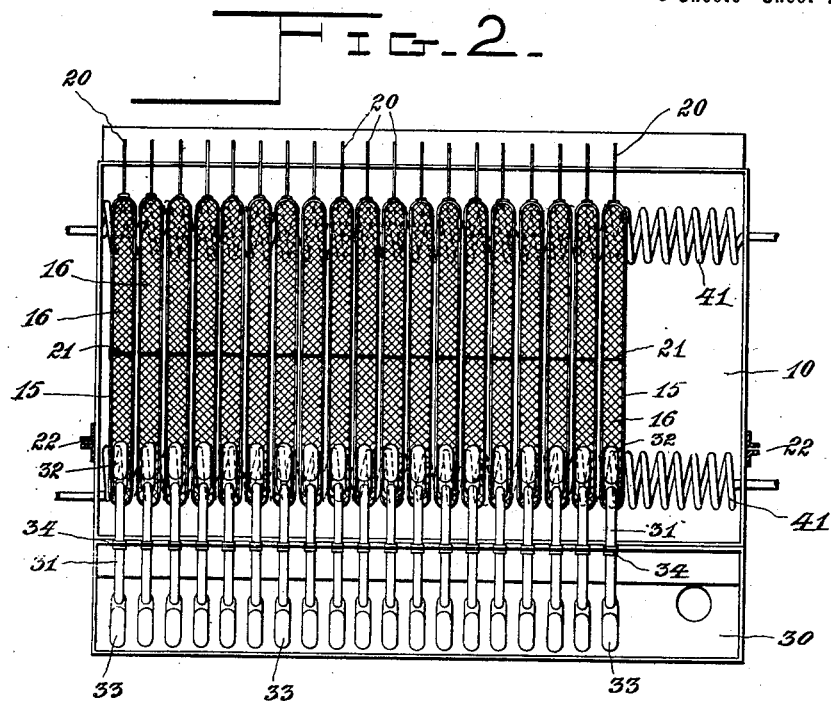
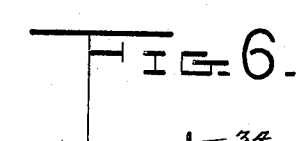
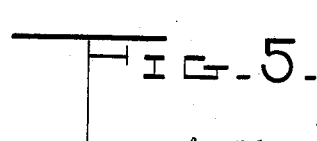
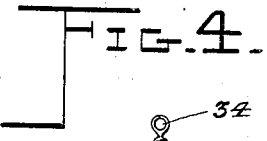
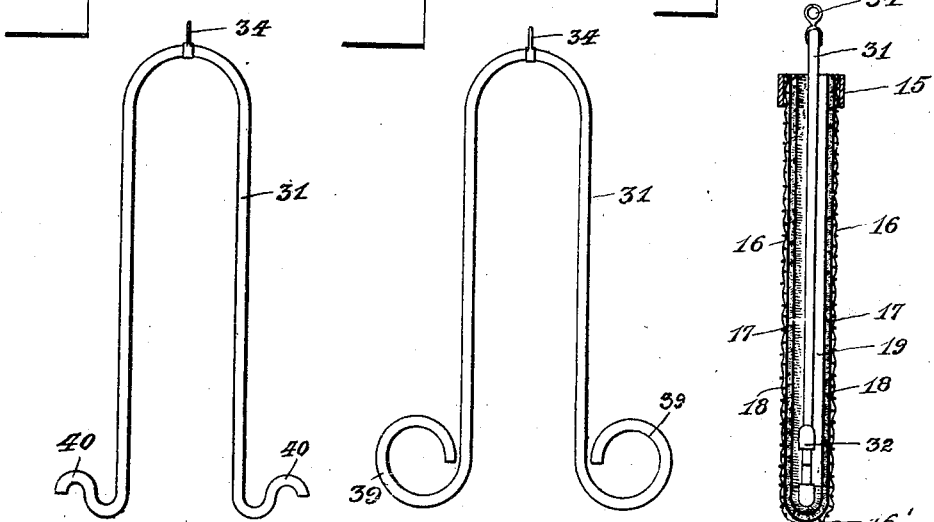
Witnesses: Wilbrod Dorval, Inventor
By Marion Marion
Attorneys

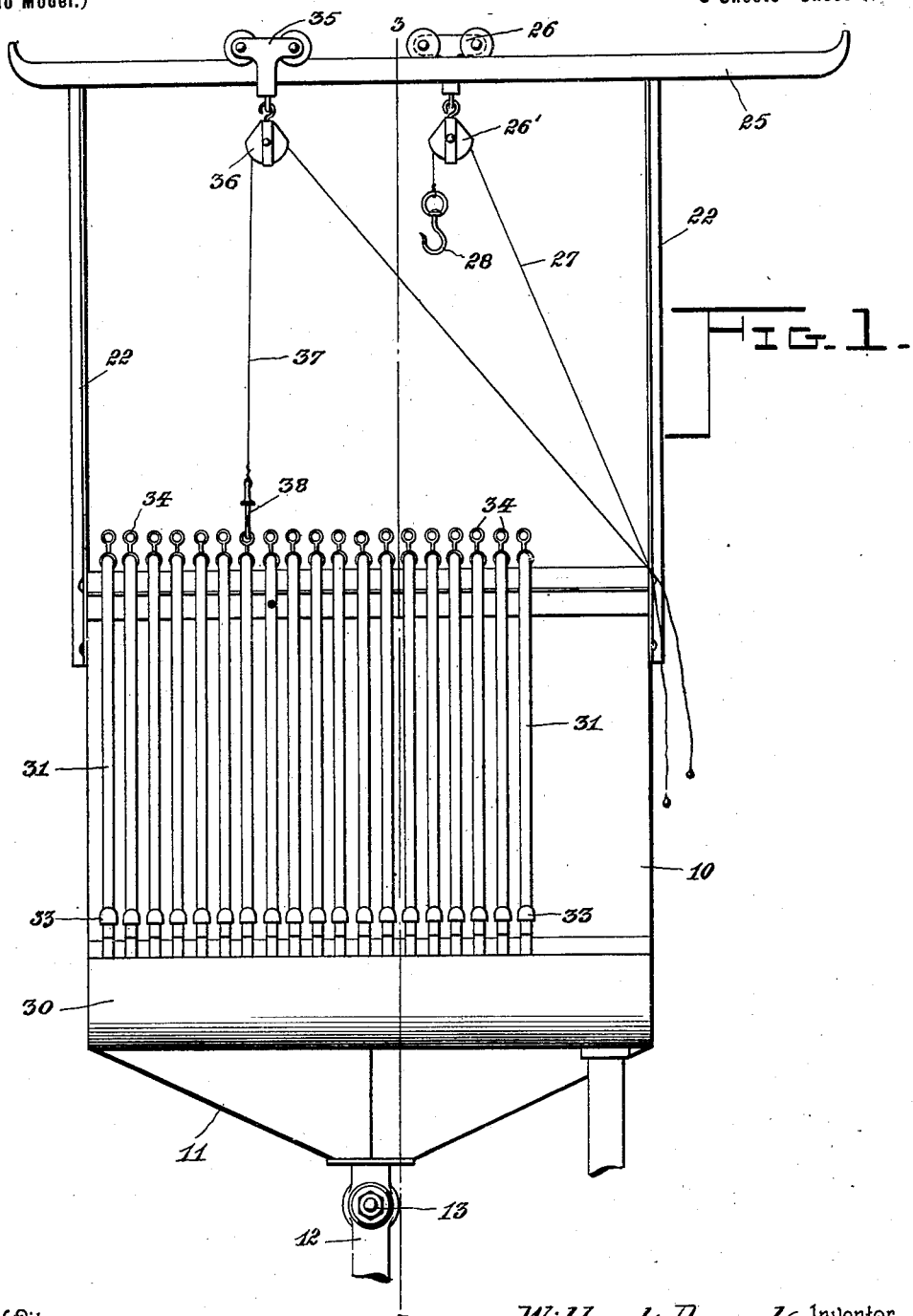

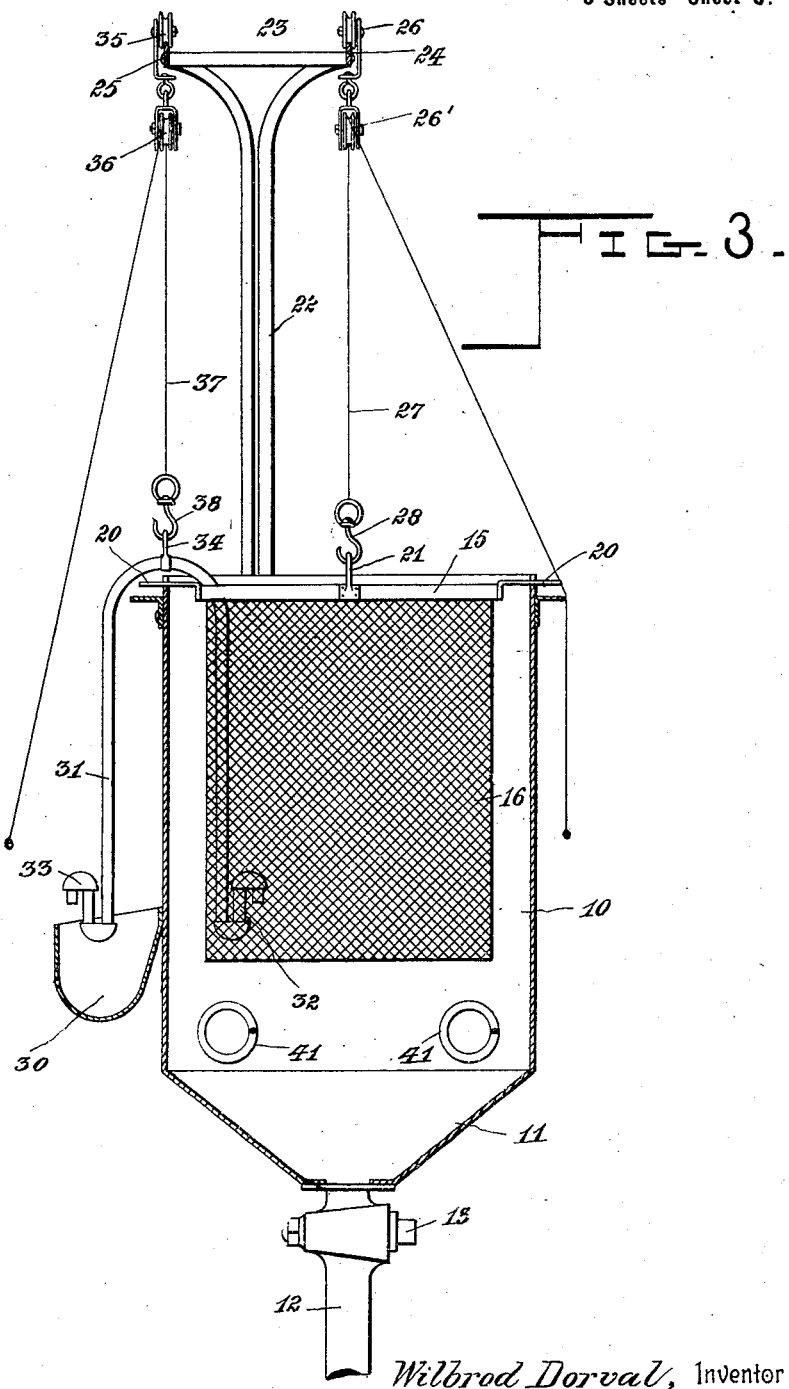

UNITED STATES PATENT OFFICE.

WILBROD DORVAL, OF BINGHAMTON, NEW YORK.

FILTER.

SPECIFICATION forming part of Letters Patent No. 660,151, dated October 23, 1900.

Application filed April 23, 1900. Serial No. 13,861. (No model.)

*To all whom it may concern:*

Be it known that I, WILBROD DORVAL, a citizen of the United States, residing at Binghamton, county of Broome, State of New York, have invented certain new and useful Improvements in Filters; and I do hereby declare that the following is a full, clear, and exact description of the invention, such as will enable others skilled in the art to which it appertains to make and use the same.

My invention relates to improvements in filters; and one object is to provide a simple apparatus especially adapted for the mechanical filtration of the liquid extract obtained from beets in the manufacture of sugar.

A further object is to provide a series of filtering members or frames, each of which may be conveniently lifted and withdrawn from a vat for the purpose of cleaning or repairing the same.

A further object is to provide individual siphons for discharging the liquid filtered by the separate frames or members into a common receptacle or tank, and, furthermore, to provide means whereby the siphons may be individually withdrawn from the frames or members with which they are associated.

Further objects and advantages of the invention will appear in the course of the subjoined description, and the novelty in the combinations of devices and in the construction and arrangements of parts will be defined by the claims.

In the accompanying drawings I have represented a filter which embodies the several features of my invention in their preferred form, and to these drawings I shall now refer in order to explain more clearly the nature of the invention and the manner in which the same is or may be carried into effect.

Figure 1 is a side elevation of a beet-syrup filter constructed in accordance with my invention. Fig. 2 is a plan view of the apparatus, omitting the overhead trolleys and their supporting devices. Fig. 3 is a vertical transverse sectional elevation through the apparatus in the plane of the dotted line 3 3 on Fig. 1. Fig. 4 is an enlarged vertical transverse section through one of the filtering members or frames detached from the apparatus. Figs. 5 and 6 are detail views of other forms of siphons, either of which may be used in my apparatus.

The same numerals of reference are used to indicate like parts in each of the several figures of the drawings.

10 designates the vat, which is opened at its upper side and is constructed with a sloping bottom 11, from which extends the drain-pipe 12, the latter being provided with a cock 13, which may be opened for the purpose of draining the residue or refuse that remains in the bottom part of the vat after the liquid or syrup which is filtered by the members or frames shall have been discharged through the medium of the siphons, as will hereinafter appear.

I employ a plurality of filtering members or frames, which are arranged in parallel relation and close together, as shown by Fig. 2, said frames being suspended removably within the vat, so that they may be withdrawn individually therefrom for the purpose of repairing or cleansing each frame.

I have devised a novel construction for each member or frame of the filtering apparatus, which construction accommodates one leg of one of a series of siphons, whereby the latter may be inserted into and withdrawn from the filtering members or frames. Each member consists of a boundary-band 15, a foraminous receptacle 16, a layer 17 of filtering material, and the filtering medium 18, reference being had more particularly to Figs. 2 and 4. The boundary-frame 15 of each filter member is in the form of a loop and is constructed, preferably, of bar or strap metal, although a loop-shaped cast-metal band may be adopted, if desired. The foraminous receptacle 16 is shown as constructed of wire fabric, with a closed lower end 16', and having its upper open end secured to the loop-shaped boundary-band 15, although this foraminous receptacle may be made of perforated sheet metal or other material. The filtering layer 17 is housed or contained within the foraminous receptacle, and it is preferably made of fabric—such, for instance, as bagging. The filtering layer 17 is packed or charged with a filtering medium 18, such as cotton; but the particular materials employed for the layer and the medium may be modified within the skill of the constructor.

In the embodiment of the invention shown by Fig. 4 the filtering layer 17 is shown as consisting of two plies of fabric, with the packing 18 between the plies of fabric. This filtering layer is in the form of a bag, having a closed lower end and an open upper end, (see Fig. 4,) each side of said bag having the two plies and the packing. In this bag or filtering layer is fitted one leg of a siphon, whereby the siphon may be easily withdrawn from the packed layer 17 or filtering member without displacing the packing 18, which is held or confined between the plies of the bag-shaped filtering layer.

The packed filtering layer practically forms a lining for the foraminous receptacle within which said layer is inclosed, and this layer may be attached to the walls of the receptacle, so as to form the chamber 19, into which is thrust the short leg of a siphon. The entire filtering member is suspended removably within the vat by the employment of arms 20, which are made fast with the boundary-band 15, so as to extend in opposite directions therefrom and to rest upon the upper edges of the vat. Each filtering member has the boundary-band 15 also provided with a central loop or eye 21, which extends upwardly, so that it is exposed for convenient access by a lifting and suspending device.

At the ends of the vat are arranged the supporting-standards 22, which carry the cross-heads 23, and these cross-heads at opposite ends of the vat are connected by the parallel track-rails 24 25, the latter arranged in horizontal positions at a suitable elevation above the vat and the filtering members suspended therein. The track-rail 24 is arranged in the vertical plane of the loops 21 on the filtering members, and on this track-rail is adapted to travel the wheels or rollers of the trolley 26, the latter being shiftable along the track to occupy a position over either of the filtering members. From this trolley is suspended the sheave 26', through which is reeved the cable 27, the latter being provided at one end with a hook 28 and having its other end disposed within convenient reach of an attendant on one side of the vat. It is evident that the trolley may be moved along the track 24 over either of the series of filtering members and that the hook 28 of the cable may be fitted in the loop or eye 21 of that particular filtering member. The cable 27 may now be drawn downward, so as to lift the particular filtering member to which its hook is connected out of the vat without disturbing the position of any other filtering member of the series, and the elevated member may now be removed from the hook and from the apparatus, whereby easy access may be attained to the member for the purpose of renewing the filtering media or of cleaning the foraminous receptacle from solid matter that may adhere thereto and obstruct the interstices thereof. It is furthermore evident that the cleansed member may be restored to its position in the tank with ease and despatch.

I have also provided my apparatus with a series of siphons which are operatively combined with the series of suspended filtering members for the purpose of discharging the filtered liquid that accumulates in the chambers 19 into a common collecting-tank 30, the latter being arranged at one side of the vat and extending lengthwise thereof, as shown by Figs. 1 and 2. These siphons 31 correspond in number to the filtering members, so that they are individually related thereto, and they are arranged to straddle one of the side walls of the vat for the purpose of having one leg of each siphon enter the chamber of one filtering member, while the other leg of each siphon discharges into the collecting-tank. These siphons may rest against the filtering members or upon the vat or be otherwise supported, so that they may be easily withdrawn from the filtering member previous to the withdrawal of the filtering member itself from the vat. Each siphon has one leg provided with an elbow 32, which extends into the chamber 19 of one filtering member, so as to lie close to the bottom thereof. (See Figs. 3 and 4.) The other leg of the siphon has an elbow 33, which overhangs the collecting-tank and is adapted to discharge the filtered liquid into the latter. The series of siphons are, furthermore, provided at their upper loop-shaped ends with the eyes or loops 34, adapted to be engaged by a hook 38 on one end of the cable 37, which is reeved through a sheave 36, suspended from the trolley 35, the latter being adapted to the track-rail 25, which is disposed in the vertical plane of the loops or eyes 34 on the series of siphons. It is evident that this trolley 35 may be shifted along the track-rail 25 to assume a position over either of the series of siphons, after which the hook 38 may be connected with the eye 34 of that particular siphon and the cable 37 manipulated to elevate said siphon and withdraw it from the filtering member with which it is associated. The elbows 33 on each siphon may be modified in shape without departing from this invention—as, for instance, the ends of the siphon may be bent into the loops 39, as shown by Fig. 5, or the ends of the siphon may have the compound curved elbows 40. (Shown by Fig. 6.)

To maintain the contents of the vat in a proper state of liquefaction to facilitate the filtration thereof, I employ means for heating the liquid contained in the vat. This heating means is in the form of the coils 41, arranged in the bottom part of the vat below the suspended filtering members. (See Figs. 2 and 3.) The coils extend longitudinally of the vat, and the ends thereof are passed through the walls of the vat, thus disposing the coils for the attachment of the circulating-pipes, which may be supplied with steam or hot air from any suitable type of generator.

This being the construction of my apparatus, the operation will be described, briefly, as follows: The liquid to be filtered is introduced into the vat in any suitable way, and it percolates through the filtering media of the suspended members, so as to accumulate in the chamber 19 thereof. The particles of refuse contained in the liquid are caught by the foraminous receptacles and the filtering media therein, while the clear liquid is discharged from the chambers 19 of the members by siphonic action through the siphons and into the collecting-tank. To clean either of the filtering members, the trolley 35 is shifted on the track 25, and the hook of its cable is connected to the siphon of the member which it is desired to clean, said siphon being lifted out of that member by the operation of the cable 37. The other trolley 26 is now moved along the other track, and its cable 27 has its hook connected to the member, whereby the cable 37 may be operated to lift the member out of the vat, and said member may be easily cleaned.

The parts of my apparatus are simple in construction, efficient in operation, may be easily withdrawn and replaced, and the apparatus as a whole may be built at a moderate cost.

While I have herein shown a preferred form of carrying my invention into effect, yet I do not desire to limit myself to such preferred details of construction, but claim the right to use any and all modifications thereof which will serve to carry into effect the objects to be attained by this invention.

Having thus described my invention, what I claim as new is—

1. A filtering apparatus substantially such as described, comprising a vat, a series of hollow packed filtering members within said vat, a collecting-tank, and a series of siphons, each siphon being associated with one of said filtering members and with said tank, whereby the filtered contents of the filtering members may be discharged into the tank, as set forth.

2. A filtering apparatus substantially such as described, comprising a vat, a series of members therein, a collecting-tank, and a series of siphons operatively and individually related to the members and arranged to discharge into the tank, as set forth.

3. A filtering apparatus comprising a vat, a series of members suspended removably therein, and a series of removable siphons operatively and individually related to the members, whereby each siphon and its companion member may be withdrawn without disturbing the relation of other siphons and members, substantially as and for the purposes set forth.

4. A filtering apparatus comprising a vat, a series of filtering members suspended therein, a like series of siphons in operative relation to the members, means whereby the siphons may be individually withdrawn from said members, and means for withdrawing either member from the vat, substantially as described.

5. A filtering apparatus comprising a vat, a series of filtering members suspended therein, an overhead track, a trolley adapted to said track and a hoisting-cable guided on the trolley and adapted to be connected detachably to either of said members, substantially as described.

6. A filtering apparatus comprising a vat, a series of members suspended therein and provided with loops or eyes arranged in a common plane longitudinally of the vat, an elevated track in the vertical plane of said loops or eyes on the members, a trolley on said track and a cable guided on the trolley and having a hook adapted for engagement with the eye of either member, substantially as described.

7. In a filtering apparatus, a member comprising a loop-shaped frame, a foraminous receptacle attached to said frame and having a lower closed end and an open upper end, and filtering media within said receptacle and forming a chamber for the reception of the clear liquid, as and for the purposes set forth.

8. In a filtering apparatus, a filtering member comprising a frame provided with suspension devices, a foraminous receptacle attached to said frame and open at its upper end, a packed filtering-lining within said receptacle and forming a chamber, and a suspension-loop connected to the frame, substantially as described.

9. In a filtering apparatus, a filtering member comprising a foraminous receptacle closed at its bottom and open at its top, and a filtering layer within said receptacle and forming a chamber for the free accumulation of the clear liquid, substantially as set forth.

10. A filtering apparatus comprising a vat, an external collecting-tank, a series of filtering members within said vat, a series of siphons fitted removably in said members, a shiftable trolley, a track therefor, and a cable fitted to the trolley and arranged to have detachable connection with either of said siphons, substantially as described.

11. A filtering apparatus comprising a vat, a collecting-tank, a series of members suspended in the vat, a series of siphons arranged to straddle the vat and for each siphon to have one leg fit removably in a member and its other leg overhang the tank, a series of eyes on the siphons and arranged in a common plane longitudinally of the vat, an elevated track in the vertical plane of said loops, a trolley and a cable connected to the trolley and having a hook to engage with the loop of either siphon, substantially as described.

12. A filtering apparatus comprising a vat having the sloping bottom, a valved drain-pipe connected to said vat, filtering members suspended in the vat, heating-coils within the vat below said members, an external tank, siphons removably fitted to the members, and means for separately removing the members and siphons, as set forth.

In witness whereof I have hereunto set my hand in the presence of two witnesses.

WILBROD DORVAL.

Witnesses:
JOHN F. DENFLERWIEL,
FRY J. O'NEILL.